United States Patent
Konishiike et al.

(10) Patent No.: US 8,802,286 B2
(45) Date of Patent: Aug. 12, 2014

(54) NEGATIVE ELECTRODE FOR USE WITH SECONDARY BATTERY AND SECONDARY BATTERY USING SUCH NEGATIVE ELECTRODE

(75) Inventors: Isamu Konishiike, Fukushima (JP); Kenichi Kawase, Fukushima (JP); Shigeru Fujita, Fukushima (JP); Momoe Adachi, Tokyo (JP)

(73) Assignee: Sony Corporation, Tokyo (JP)

( * ) Notice: Subject to any disclaimer, the term of this patent is extended or adjusted under 35 U.S.C. 154(b) by 1419 days.

(21) Appl. No.: 11/668,634

(22) Filed: Jan. 30, 2007

(65) Prior Publication Data

US 2008/0280201 A1  Nov. 13, 2008

(30) Foreign Application Priority Data

Jan. 30, 2006  (JP) ................. P2006-021465

(51) Int. Cl.
*H01M 4/02* (2006.01)
*H01M 10/052* (2010.01)
*H01M 4/78* (2006.01)
*H01M 4/36* (2006.01)
*H01M 4/66* (2006.01)
*H01M 4/134* (2010.01)
*H01M 10/0569* (2010.01)
*H01M 4/38* (2006.01)
*H01M 4/70* (2006.01)
*H01M 4/1395* (2010.01)

(52) U.S. Cl.
CPC ............ *H01M 4/78* (2013.01); *H01M 10/0569* (2013.01); *H01M 2300/0025* (2013.01); *H01M 10/052* (2013.01); *H01M 4/38* (2013.01); *H01M 4/70* (2013.01); *Y02E 60/122* (2013.01); *H01M 4/366* (2013.01); *H01M 4/666* (2013.01); *H01M 4/134* (2013.01); *H01M 4/1395* (2013.01)
USPC ......................................... 429/209

(58) Field of Classification Search
USPC .......................................... 429/209
See application file for complete search history.

(56) References Cited

U.S. PATENT DOCUMENTS

| 4,761,352 | A | * | 8/1988 | Bakos et al. ............ 429/94 |
| 2002/0018928 | A1 | * | 2/2002 | Hallifax et al. ............ 429/94 |

(Continued)

FOREIGN PATENT DOCUMENTS

| JP | 08-050922 | 2/1996 |
| JP | 11-135115 | 5/1999 |
| JP | 11-339777 | 10/1999 |
| JP | 2001-035613 | 2/2001 |
| JP | 2003-303618 | 10/2003 |
| JP | 2004-356082 | 12/2004 |
| JP | 2005-141992 | * 6/2005 |
| JP | 2006-172860 | 6/2006 |

(Continued)

OTHER PUBLICATIONS

Japanese Office Action issued on Oct. 18, 2011 in connection with counterpart JP Application No. 2006-021465.

*Primary Examiner* — Ula C Ruddock
*Assistant Examiner* — Jacob Marks
(74) *Attorney, Agent, or Firm* — Dentons US LLP

(57) ABSTRACT

A negative electrode for a secondary battery includes a negative electrode current collector and a negative electrode active material layer provided in the negative electrode current collector and which is alloyed with the negative electrode current collector at least at a part of an boundary face between it and the negative electrode current collector, wherein the negative electrode current collector has a first surface on which the negative electrode active material layer is formed and a second surface on which the negative electrode active material layer is not formed, the negative electrode having a portion in which the second surfaces of the negative electrode current collector are opposed to each other.

18 Claims, 2 Drawing Sheets

(56) References Cited

U.S. PATENT DOCUMENTS

| | | | |
|---|---|---|---|
| 2003/0003370 A1* | 1/2003 | Arai et al. | 429/326 |
| 2003/0118914 A1* | 6/2003 | Mori | 429/340 |
| 2004/0248011 A1* | 12/2004 | Asao et al. | 429/231.95 |
| 2006/0099507 A1* | 5/2006 | Kogetsu et al. | 429/218.1 |

FOREIGN PATENT DOCUMENTS

| | | |
|---|---|---|
| JP | 2007-035297 | 2/2007 |
| WO | 01/29912 | 4/2001 |
| WO | 01/31721 | 5/2001 |
| WO | 2005/117197 | 12/2005 |

* cited by examiner

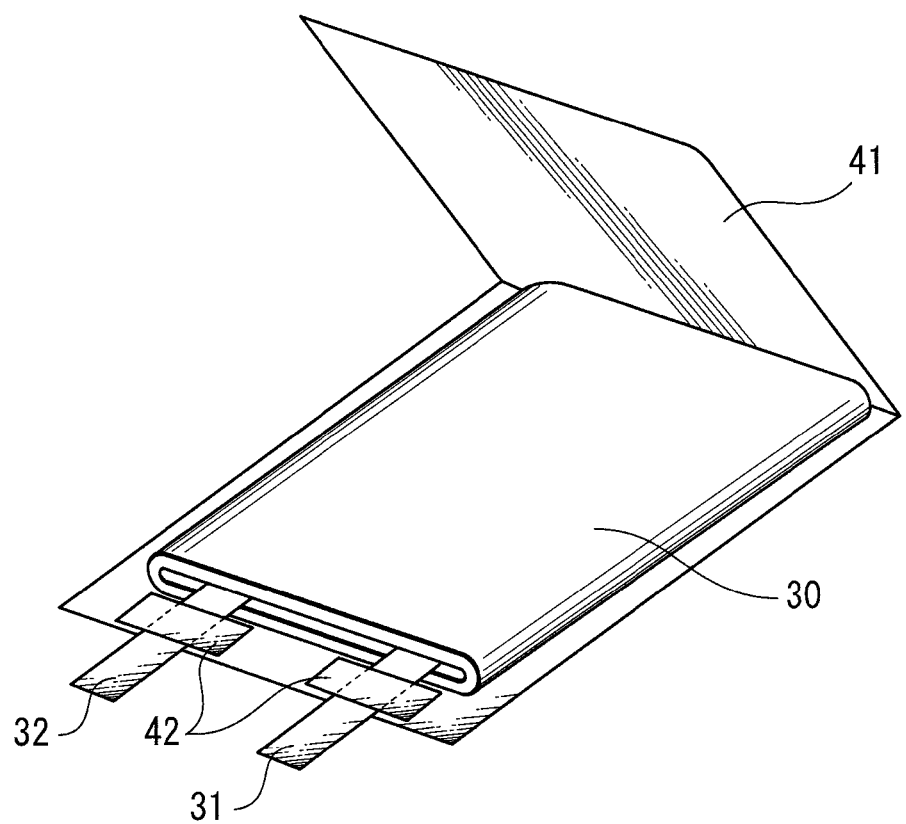

NEGATIVE ELECTRODE FOR USE WITH SECONDARY BATTERY AND SECONDARY BATTERY USING SUCH NEGATIVE ELECTRODE

CROSS REFERENCES TO RELATED APPLICATIONS

The present invention contains subject matter related to Japanese Patent Application JP 2006-021465 filed in the Japanese Patent Office on Jan. 30, 2006, the entire contents of which being incorporated herein by reference.

BACKGROUND OF THE INVENTION

1. Field of the Invention

The present invention relates to a negative electrode for use with a secondary battery in which a negative electrode active material layer is provided on a negative electrode current collector and a secondary battery using such negative electrode for a secondary battery.

2. Description of the Related Art

In recent years, high-capacity fabrication of a lithium ion secondary battery which is a power supply has been desired along with high-performance and multifunction fabrication of a mobile communication apparatus.

However, a lithium ion secondary battery used at the present day uses lithium cobalt oxide as positive electrode active material and graphite as negative electrode material, and the lithium secondary battery according to these materials is used based on a capacity which is already near the theoretical capacity, so that it has become in a situation that a still higher capacity fabrication thereof is extremely difficult.

For this reason, in recent years, investigation of a high capacity negative electrode which uses silicon (Si), tin (Sn) or the like as the negative electrode active material has been carried out actively. However, when these electrodes repeat charge and discharge, the current collection ability thereof decreases, because the active materials repeat expansion and contraction drastically and smashed and atomized. Also, decomposition of the electrolyte is accelerated along with increase of surface area of the negative electrode in which deterioration of cycle characteristic is drastic.

Consequently, apart from a method in the past which coats slurry including granulous binder or the like, there has been reviewed a method for forming negative electrode active material for the negative electrode current collector by using vapor method, liquid phase method, sintering method, spraying method or the like (for example, see Patent Document 1: Japanese unexamined patent publication No. H8-50922, Patent Document 2: Japanese Patent No. 2948205 and Patent Document 3: Japanese unexamined patent publication No. H11-135115). According to this method, it is possible to repress atomization as compared with the coating type electrode in the past and at the same time, it is possible to integrate the negative electrode current collector and the negative electrode active material layer, so that electron conductivity in the negative electrode becomes extremely favorable and high-performance fabrication is expected in point of capacity and also in point of cycle life.

However, even in the negative electrode in which the current collector and the active material layer are integrated in this manner, peeling of the current collector and the active material layer arising from expansion or contraction of the active material layer occurs, so that it was difficult to obtain an adequate characteristic.

Consequently, for example, there was proposed a method in which components of the negative electrode current collector are diffused in the negative electrode active material layer, adhesiveness of the negative electrode current collector and the negative electrode material layer is heighten and at the same time, expansion and contraction in the diffusion region is repressed (for example, see Patent Document 4: Pamphlet of PCT unexamined publication No. WO01/029912). Also, there was proposed a method in which impurity is added in the negative electrode active material layer and inclination structure is employed by changing the impurity concentration in the thickness direction (for example, see Patent Document 5: Pamphlet of PCT unexamined publication No. WO01/031721).

SUMMARY OF THE INVENTION

However, as described above, it is difficult to sufficiently suppress a negative electrode active material layer from being expanded and contracted even in a negative electrode in which the negative electrode current collector and the negative electrode active material layer are strongly integrated. As the negative electrode active material layer is drastically expanded and contracted, a large load is imposed upon the negative electrode current collector so that electrodes are deformed and broken unavoidably. As a consequence, a problem arises, in which it is difficult to improve battery characteristics such as cycle characteristic.

In order to solve the above-mentioned problems, the present invention intends to provide a negative electrode in which stress applied to the negative electrode current collector can be softened when the negative electrode active material layer is expanded and contracted upon charging and discharging and a secondary battery using such negative electrode.

According to an aspect of the present invention, there is provided a negative electrode for a secondary battery which includes a negative electrode current collector and a negative electrode active material layer provided in the negative electrode current collector and which is alloyed with the negative electrode current collector at least at a part of an boundary face between it and the negative electrode current collector. Therein the negative electrode current collector has a first surface on which the negative electrode active material layer is formed and a second surface on which the negative electrode active material layer is not formed, the negative electrode having a portion in which the second surfaces of the negative electrode current collector are opposed to each other.

According to another aspect of the present invention, there is provided a secondary battery being a battery, the battery including a positive electrode, a negative electrode and an electrolyte, wherein the negative electrode includes a negative electrode current collector and a negative electrode active material layer alloyed with the negative electrode current collector at least at its part of an boundary face between it and the negative electrode current collector. Further, the negative electrode current collector includes a first surface on which the negative electrode active material layer is formed and a second surface on which the negative electrode active material layer is not formed and the negative electrode has a portion in which the second surfaces of the negative electrode current collector are opposed to each other.

According to the above-mentioned arrangement of the negative electrode of the present invention, since the negative electrode in which the negative electrode current collector is partly alloyed with the negative electrode active material layer has the portion in which the second surfaces of the negative electrode current collector are opposed to each other, it is possible to soften stress applied to the negative electrode current collector when the negative electrode active material layer is expanded and contracted upon charging and discharging.

According to the above-mentioned secondary battery of the present invention, when the secondary battery is charged, lithium ions are extracted from the positive electrode and they are inserted in the negative electrode through the electrolyte. When the secondary battery is discharged, lithium ions are extracted from the negative electrode and they are inserted in the positive electrode through the electrolyte. Since the secondary battery has the portion in which the second surfaces of the negative electrode current collector are opposed to each other, it is possible to soften stress applied to the negative electrode current collector from the negative electrode active material layer when the negative electrode active material layer is expanded and contracted upon charging and discharging.

According to the negative electrode of the present invention, even when the negative electrode active material layer is repeatedly expanded and contracted upon charging and discharging, it is possible to suppress stress generated in the negative electrode, and the negative electrode can be prevented from being deformed and broken.

Accordingly, even when the secondary battery using the negative electrode of the present invention is repeatedly charged and discharged, the secondary battery of the present invention can suppress the battery capacity from being lowered and it can improve battery characteristics such as cycle characteristic.

BRIEF DESCRIPTION OF THE DRAWINGS

FIG. 5 is a schematic cross-sectional view showing an arrangement of a secondary battery using an electrode winding body formed of a negative electrode according to the present invention.

DESCRIPTION OF THE PREFERRED EMBODIMENTS

Embodiments of the present invention will be described below in detail with reference to the drawings.

Figure 1:
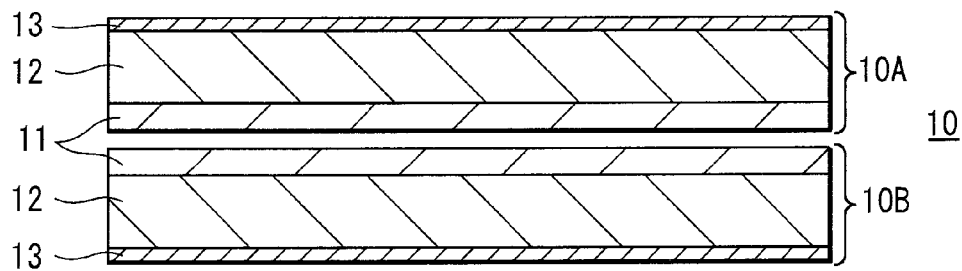
FIG. 1 is a cross-sectional view showing an arrangement of a negative electrode according to a first embodiment of the present invention.

First, FIG. 1 of the accompanying drawings shows a first embodiment according to the present invention.

A negative electrode, generally depicted by reference numeral 10 in FIG. 1, includes a negative electrode current collector 11 and a negative electrode active material layer 12 and a deposited film 13, both of which are formed on a first surface of the negative electrode current collector 11.

The negative electrode current collector 11 includes the first surface on which the negative electrode active material layer 12 is formed and a second surface in which the negative electrode active material layer 12 is not formed. More specifically, the negative electrode active material layer 12 is formed on one side surface of the negative electrode current collector 11.

Then, two negative electrodes 10A and 10B are paired in such a manner that the second surfaces of the negative electrode current collectors 11 may be opposed to each other.

Figure 2:
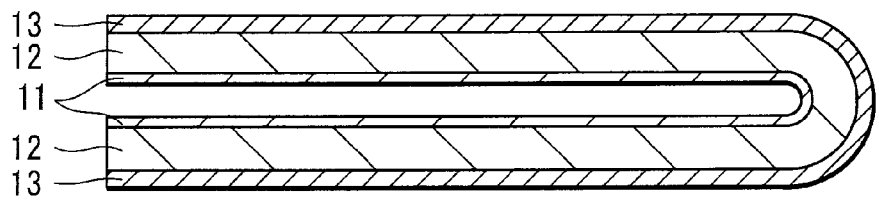
FIG. 2 is a cross-sectional view showing other arrangement of a negative electrode according to the first embodiment of the present invention.

In the negative electrode 10, the independent two negative electrodes 10A and 10B may be laminated together such that the second surfaces of the negative electrode current collectors 11 may be opposed to each other. Alternatively, as shown in FIG. 2, either the single negative electrode 10A or 10B may be folded back so that the second surfaces of the negative electrode current collectors 11 may be opposed to each other.

According to the above-described arrangement of the negative electrode 10, it is possible to soften stress applied to the negative electrode current collector 11 from the negative electrode active material layer 12 when the negative electrode active material layer 12 is expanded or contracted in accordance with charging and discharging. In other words, according to the above-described arrangement, the negative electrode current collectors 11 can be freely expanded and contracted at their portions in which the second surfaces of the negative electrode current collectors 11 are opposed to each other. For this reason, as compared with the case in which the negative electrode active material layers 12 are formed on both surfaces of the negative electrode current collector 11, the negative electrode current collector 11 can be deformed with increased freedom when stress is applied thereto and hence stress applied to the negative electrode current collector 11 can be softened.

The negative electrode current collector 11 should preferably be made of metal materials containing at least one kind of metal element by which lithium and intermetallic compound may not be formed. When the lithium and the intermetallic compound are formed, the negative electrode current collector 11 is expanded or contracted in accordance with charging and discharging and the structure of the negative electrode current collector 11 is broken with the result that a current collection rate is lowered unavoidably. Further, the negative electrode current collector 11 decreases its power to support the negative electrode active material layer 11 so that the negative electrode active material layer 12 may become easy to be separated from the negative electrode current collector 11.

Copper (Cu), nickel (Ni), titanium (Ti), iron (Fe) or chromium (Cr) should be preferable as metal elements by which the lithium and the intermetallic compound may not be formed.

Further, the negative electrode current collector 11 should be preferably formed of a metal element that can be alloyed with the negative electrode active material layer 12. For example, when the negative electrode active material layer 12 contains silicon (Si) or tin (Sn) as an element, the negative electrode active material layer 12 is repeatedly expanded and contracted considerably so that the negative electrode active material layer 12 may become easy to separate from the negative electrode current collector 11. For this reason, the negative electrode active material layer 12 and part of the negative electrode current collector 11 are alloyed with each other and they are strongly bonded together, whereby the negative electrode material layer 12 can be suppressed from being separated from the negative electrode current collector 11.

Copper (Cu), nickel (Ni) and iron (Fe) are available as metal elements by which the lithium and the intermetallic compound may not be formed and which may be alloyed with the negative electrode active material layer 12. These metal elements copper (Cu), nickel (Ni) and iron (Fe) are preferable from standpoints of strength and conductivity.

It should be noted that the negative electrode current collector 11 may be formed of either a single layer or a multilayer. When the negative electrode current collector 11 has a multilayer structure, it is preferable that a layer that contacts with the negative electrode active material layer 12 should be constructed by a metal material, such as copper (Cu), nickel (Ni) and iron (Fe), that can be alloyed with the negative electrode active material layer 12. Also, it is preferable that the negative electrode current collector 11 should be constructed at its other portions than the boundary face with the negative electrode active material layer by a metal material made of at least by one kind of metal elements which may not form the lithium and the intermetallic compound.

It is preferable that surface roughness of the first surface on which the negative electrode active material layer 12 of the negative electrode current collector 11 is formed, more specifically, a ten-point mean roughness Rz defined in JIS B0601-1994 should lie in a range of from 1.2 µm to 9.0 µm.

By selecting the ten-point mean roughness Rz of the first surface of the negative electrode current collector 11 to be greater than 1.2 µm, it is possible to improve anchor effects between the negative electrode current collector 11 and the negative electrode active material layer 12 so that adhesion between the negative electrode current collector 11 and the negative electrode active material layer 12 can be improved.

Further, if the negative electrode current collector 11 contains metal elements which can be alloyed with the negative electrode active material layer 12, then it is possible to accelerate a speed at which the negative electrode current collector 11 and the negative electrode active material layer 12 can be alloyed with each other.

For this reason, when charging and discharging are repeated, it is possible to prevent the negative electrode active material layer 12 from being atomized by smashing and hence cycle characteristic can be improved.

Surface roughness of the negative electrode current collector 11 at its second surface in which the negative electrode active material layer 12, more specifically, a ten-point mean roughness Rz defined in JIS B0601-1994 should be preferably selected in a range of from 1.5 µm to 9.0 µm.

If the ten-point mean roughness Rz of the second surface of the negative electrode current collector 11 is selected to be greater than 1.5 µm, then a space to soften stress applied to the negative electrode current collector 11 from the negative electrode active material layer 12 expanded and contracted when charging and discharging are repeated can be formed on the surface in which the negative electrode current collectors 11 are contacted with each other.

It should be noted that, when the ten-point mean roughness Rz of both of the first and second surfaces of the negative electrode current collector 11 are beyond 9.0 µm, cycle characteristic is lowered, thereby decreasing capacity retention rate.

It is preferable that the negative electrode active material layer 12 should contain silicon (Si) or tin (Sn) as elements because silicon (Si) and tin (Sn) are high in ability to insert and exclude lithium so that they are able to obtain high energy density. The silicon (Si) and the tin (Sn) may be contained in the negative electrode active material layer 12 as a single substance or they may be either as alloys with other metals or as compounds with other materials.

The negative electrode active material layer 12 may be formed by at least one method selected from a vapor phase method, a spraying method and a sintering method, for example. Since the negative electrode active material layer 12 formed by these methods can be suppressed from being expanded and contracted in accordance with charging and discharging and the negative electrode current collector 11 and the negative electrode active material layer 12 can be integrally formed as one body, it is possible to improve electron conductivity in the negative electrode active material layer 12. Also, since a binder and a gap can be decreased or removed, the negative electrode active material layer 12 can be formed with high density and the negative electrode 10 can be reduced in thickness.

Also, in order that the negative electrode active material layer 12 may not be separated from the negative electrode current collector 11 when it is expanded and contracted, it is preferable that the negative electrode active material layer 12 should be alloyed with the negative electrode current collector 11 at least at a part of the boundary face between it and the negative electrode current collector 11.

Specifically, the element of the negative electrode current collector 11 and the element of the negative electrode active material layer 12 should preferably be diffused to each other in the boundary face or one should be diffused into the other in the boundary face. It should be noted that alloying in the present invention may include the above-mentioned diffusion of the elements.

Also, the negative electrode active material layer 12 contains oxygen as an element.

When the negative electrode active material layer 12 contains oxygen, it is possible to suppress the negative electrode active material layer 12 from being expanded and contracted in accordance with charging and discharging.

Oxygen may be bonded to the negative electrode active material layer 12 or it may not be bonded to the negative electrode active material layer 12. A mean oxygen content in the negative electrode active material layer 12 should be preferably selected in a range of from 3 atomic % to 45 atomic %.

Also, it is preferable that the oxygen content of the side of the negative electrode current collector 11 of the negative electrode active material layer 12 should be larger than that of the side of the deposited film 13.

Assuming now that A is a mean oxygen content of the side of the negative electrode current collector 11 when the negative electrode active material layer 12 and that B is a mean oxygen content of the side of the deposited film 13, it is preferable that a difference A−B should fall in a range of from 2 atomic % to 30 atomic %.

If the content of oxygen in the negative electrode active material layer 12 is defined as described above, then it is possible to suppress the negative electrode active material layer 12 from being expanded and contracted. In particular, it is possible to effectively suppress the negative electrode active material layer 12 from being expanded and contracted on the side of the negative electrode current collector 11.

It should be noted that the mean oxygen content is the mean of results obtained when compositions of a plurality of portions of the thickness direction of the negative electrode active layer 12 are measured by a cross-section line analysis using AES (Auger Electron Spectroscopy) after the cross-section of the negative electrode active material layer 12 was sliced by FIB (Focused Ion Beam), for example. It is preferable that there should be many portions to be measured. For example, it is preferable that the number of the measured portions should be randomly selected to be greater than five and it is more preferable that the number of the measured portions should be randomly selected to be greater than 10.

The boundary face between the negative electrode active material layer 12 and the negative electrode current collector 11 is assumed to be a portion in which the content of the active material and the content of the metal elements constructing the negative electrode current collector 11 are inverted. More specifically, the negative electrode active material layer 12 starts from the portion in which the content of the active material becomes larger than that of the metal elements constructing the negative electrode current collector 11.

The boundary face between the negative electrode active material layer 12 and the deposited film 13 is assumed to be a portion in which the content of the active material and the content of elements other than the active material are inverted. More specifically, the negative electrode material layer 12 is formed up to the portion in which the content of the active material is larger than that of other elements. Further, when the mean oxygen content is calculated, if the negative electrode active material layer 12 is cracked, then such cracked portion is excluded from the portion in which the mean oxygen content is to be measured.

According to this negative electrode 10, the negative electrode 10 has the negative electrode structure in which each surface is separated and it has the negative electrode structure in which the negative electrode current collector 11 forms the portion in which the negative electrode current collectors 11 are opposed to each other without the negative electrode active material layer 12. Therefore, it is possible to soften stress applied to the negative electrode current collector 11 from the negative electrode active material layer 12 when the negative electrode active material layer 12 is expanded and contracted upon charging and discharging.

Further, since the surface of the negative electrode current collector 11 is formed as the rough surface, it is possible to soften stress considerably.

Also, according to this negative electrode 10, since oxygen contained in the negative electrode material layer 12 is such one that the mean oxygen content A on the side of the negative electrode current collector 11 is larger than the mean oxygen content B on the surface side, the negative electrode active material layer 12 can be suppressed from being expanded and contracted upon charging and discharging, in particular, the negative electrode active material layer 12 can be suppressed at its portion near the negative electrode current collector 11 from being expanded and contracted. Consequently, the negative electrode active material layer 12 can be suppressed from being separated from the negative electrode current collector 11.

Also, since the mean oxygen content in the negative electrode active material layer 1 is selected to be less than 45 atomic %, the mean oxygen content A on the side of the negative electrode current collector 11 is selected to be larger than the mean oxygen content B on the surface side and the difference A−B is selected in a range of from 2 atomic % to 30 atomic %, it is possible to suppress the negative electrode active material layer 12 from being expanded and contracted particularly at its portion near the negative electrode current collector 11. In consequence, it is possible to suppress the negative electrode active material layer 12 from being separated from the negative electrode current collector 11 and hence the battery characteristic such as the cycle characteristic can be improved.

Next, a second embodiment of the present invention will be described with reference to FIG. 3.

Figure 3:
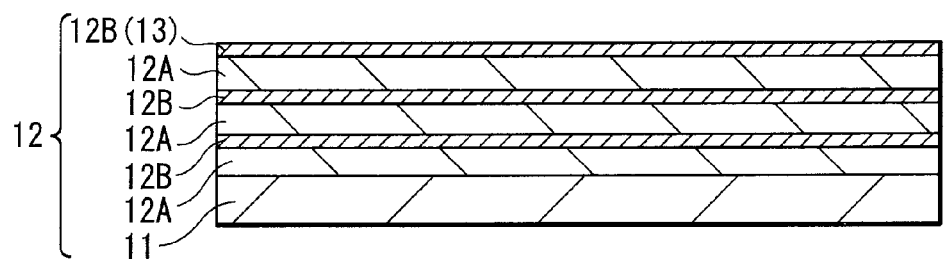
FIG. 3 is a cross-sectional view showing an arrangement of a negative electrode according to a second embodiment of the present invention.

As shown in FIG. 3, the negative electrodes 10A and 10B may be configured so as to have a plurality of layers in which the negative electrode active material layer 12 is formed by alternately laminating first and second layers 12A and 12B with different oxygen contents. The surface of the negative electrode active material layer 12 may be formed as the deposited film 13 (see FIG. 1) made of oxide or hydroxide.

It should be noted that elements and parts except the arrangement in which the negative electrode active material layer 12 is composed of a plurality of layers are the same as those of the negative electrodes 10A and 10B shown in FIG. 1. Therefore, in FIG. 3, elements and parts identical to those of FIG. 1 are denoted by identical reference numerals and need not be described.

The negative electrode active material layer 12 shown in FIG. 3 includes a plurality of first and second layers 12A and 12B with different oxygen contents laminated alternately in the sequential order of the first layer 12A and the second layer 12B from the side of the negative electrode current collector 11B, whereby the negative electrode active material layer 12 can be suppressed drastically expanded and contracted upon charging and discharging and thereby the structure of the negative electrode active material layer 12 can be suppressed from being broken.

To be concrete, the first layer 12A contains any of more than one kind or two kinds of a single substance of silicon (Si) or tin (Sn) or an alloy thereof or a compound thereof as a negative electrode active material. The first layer 12A may contain other negative electrode active materials if necessary. It is preferable that the content of the negative electrode active material in the first layer 12A should be greater than 90 atomic % so that larger capacity can be obtained. Although the first layer 12A may contain oxygen, the oxygen content in the first layer 12A should be smaller than that in the second layer 12B. It is preferable that the oxygen content of the first layer 12A should be as small as possible.

The second layer 12B contains oxygen in addition to the negative electrode active material and it may contain other elements if necessary. For example, when the first layer 12A contains an alloy of silicon (Si), elements which may be alloyed with the silicon (Si) are enumerated as other elements. It should be noted that the oxygen contained in the second layer 12B is mainly bonded to silicon (Si) or tin (Sn) or other elements so that it may exist as oxide. The content of silicon (Si) or tin (Sn) in the second layer 12B should be preferably selected in such a manner that the content of the silicon (Si) is less than 90 atomic % and that the content of oxygen (O) is greater than 10 atomic % so that it is possible to effectively suppress the structure of the negative electrode active material layer 12 from being broken as the negative electrode active material layer 12 is expanded and contracted.

It should be noted that a mean thickness of the second layer 12B located between the first layers 12A and 12A is less than 0.5 μm because electron conduction properties of the whole of the negative electrode active material layer 12 or diffusion properties of lithium ion may be lowered if the second layer 12B is too thick. However, since it is frequently observed that the uppermost surface layer 12B is oxidized naturally, the thickness of the second layer 12B may be larger than 0.5 μm. Also, it should be noted that an adjacent spacing across the first layer 12A, specifically, a distance between the centers in the thickness direction of the second layer 12B is less than 2 μm. The reason for this is that, if the spacing between the second layers 12B and 12B is too wide, effects may not be achieved sufficiently.

It should be noted that the mean oxygen content can be measured similarly to the above-mentioned method. The mean oxygen content is the mean of results obtained when compositions of a plurality of portions of the thickness direction of the negative electrode active layer 12 are measured by a cross-section line analysis using AES (Auger Electron Spectroscopy) after the cross-section of the negative electrode active material layer 12 was sliced by FIB (Focused Ion Beam), for example. It is preferable that there should be many portions to be measured. For example, it is preferable that the number of the measured portions should be randomly selected to be greater than five and it is more preferable that the number of the measured portions should be randomly selected to be greater than 10.

The boundary face between the negative electrode active material layer 12 and the negative electrode current collector 11 is assumed to be a portion in which the content of the active material and the content of the metal elements constructing the negative electrode current collector 11 are inverted. More specifically, the negative electrode active material layer 12 starts from the portion in which the content of the active material becomes larger than that of the metal elements constructing the negative electrode current collector 11.

The boundary face between the negative electrode active material layer 12 and the deposited film 13 is assumed to be a portion in which the content of the active material and the content of elements other than the active material are inverted. More specifically, the negative electrode material layer 12 is formed up to the portion in which the content of the active material is larger than that of other elements. Further, when the mean oxygen content is calculated, if the negative electrode active material layer 12 is cracked, then such cracked portion is excluded from the portion in which the mean oxygen content is to be measured.

According to the second embodiment of the present invention, as shown in FIG. 3, by alternately laminating the first and second layers 12A and 12B with different oxygen contents in the negative electrode material layer 12, it is possible to suppress the negative electrode active material layer 12 from being expanded and contracted as the secondary battery is charged and discharged and hence it is possible to improve the cycle characteristic of the secondary battery.

Next, a third embodiment of the present invention will be described with reference to FIG. 4.

Figure 4:
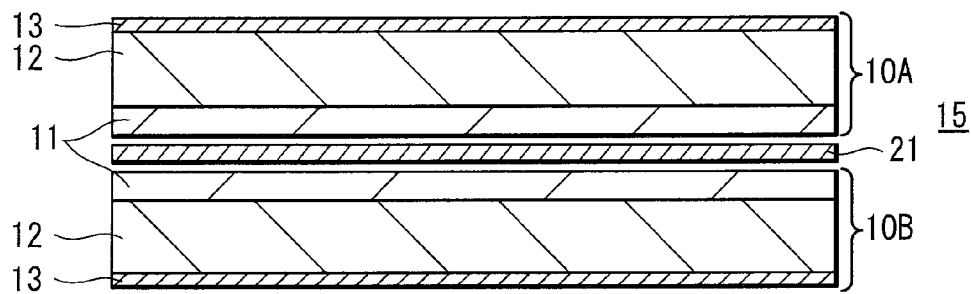
FIG. 4 is a cross-sectional view showing an arrangement of a negative electrode according to a third embodiment of the present invention.

A negative electrode 15 shown in FIG. 4 includes the negative electrode current collectors 11, the negative electrode active material layers 1 provided on the first surfaces of the negative electrode current collectors 11, the deposited films 13 and an interlayer material 21 and the two electrodes 10A and 10B are configured such that the second surfaces of the negative electrode current collectors 11 and 11 are opposed to each other through the interlayer material 21.

It should be noted that the negative electrode 15 shown in FIG. 4 is the same as the negative electrode 10 shown in FIG. 1 except that the interlayer material 21 is inserted between the second surfaces of the negative electrode current collectors 11 and 11. Therefore, in FIG. 4, elements and parts identical to those of FIG. 1 are denoted by identical reference numerals and therefore need not be described.

The interlayer material 21 is made of a material different from that of the negative electrode current collector 11 and it is preferable that the interlayer material 21 should be made of a highly-flexible material such as a plastic film. When the interlayer material 21 is made of a highly-flexible material, the interlayer material 21 becomes able to considerably soften stress applied to the negative electrode current collectors 11 from the negative electrode active material layer 12 when the negative electrode active material layer 12 is expanded and contracted in accordance with repeated charging and discharging. In this case, the interlayer material 21 is not only inserted between the negative electrode current collectors 11 and 11 but also the interlayer material 21 and the negative electrode current collectors 11 may be bonded together by hot melt-bond or by the use of an adhesive.

Also, it should be noted that the interlayer material 21 can be formed by using metal lithium except the highly-flexible material such as the plastic film. If the metal lithium is used as the interlayer material 21, then not only the interlayer material 21 can achieve large effects to soften stress applied to the negative electrode current collector 11 from the negative electrode active material layer 12 when the negative electrode active material layer 12 is expanded and contracted in accordance with repeated charging and discharging but also surplus lithium can be stored within the battery and a lithium effect can be achieved. Therefore, it is possible to improve the cycle characteristic more.

When the metal lithium is used as the interlayer material 21, the metal lithium and the negative electrode active material layer 12 may be short-circuited by a suitable method such as punching.

According to the third embodiment of the present invention, as shown in FIG. 4, since the secondary battery of the present invention includes the negative electrode 15 in which the second surfaces of the negative electrode current collectors 11 are opposed to each other through the interlayer material 21 made of the flexible material such as the plastic film or the metal lithium, it is possible to soften stress applied to the negative electrode current collector 11 from the negative electrode active material layer 12 when the negative electrode active material layer 12 is expanded and contracted in accordance with charging and discharging. Also, since surplus lithium can be inserted within the negative electrode 15, the rise of a battery expansion changing ratio can be suppressed, a high capacity retention ratio can be obtained and the cycle characteristic of the secondary battery can be improved.

The negative electrodes 10A and 10B having the arrangements shown in FIGS. 1 and 4 can be manufactured by the following methods.

First, a negative electrode active material is deposited on the first surface of the negative electrode current collector 11 of the metal foil of which both surfaces or one surface was made rough by a vapor phase method or a spraying method and thereby the negative electrode active material layer 12 is deposited. Alternatively, a product which results from kneading a power-like negative electrode active material and a binder is coated on the first surface of the negative electrode current collector 11 by a baking method and the negative electrode active material layer 12 is deposited by heat-treating the resultant product.

It should be noted that two or three methods of the vapor phase method, the spraying method and the baking method can be combined for use as the application to the method of depositing the negative electrode active material layer 12.

At that time, if the negative electrode active material layer 12 is deposited by the vapor phase method or the spraying method, then oxygen can be contained in the negative electrode active material layer 12 by introducing oxygen into the atmosphere. Distributions of oxygen in the negative electrode active material layer 12 can be controlled by adjusting oxygen concentrations of the atmosphere and the like.

Also, the negative electrode active material layer 12 may be divided into two layers of the negative electrode active material layer 12 by changing oxygen content.

If the negative electrode active material layer 12 is deposited by the baking method, then a precursor layer is formed by mixing silicon oxide powder into a grain-like negative electrode active material and thereby oxygen can be contained in the negative electrode active material layer 12. Distributions of oxygen can be adjusted by forming a plurality of precursor layers with different amounts of mixed silicon oxide powder.

Also, as shown in FIG. 3, the negative electrode active material layer 12 can be formed by alternately laminating the first and second layers 12A and 12B with different oxygen contents.

First, a negative electrode active material is deposited on the first surface of the negative electrode current collector 11 of the metal foil of which both surfaces or one surface was made rough by the vapor phase method. Next, the first and second layers 12A and 12B are formed by oxidizing the surface of the thus deposited negative electrode active material. It is possible to form the negative electrode active material layer 12 having the arrangement shown in FIG. 3 by repeating the above-mentioned process several times.

In the above-described negative electrode active material layer 12, the first and second layers 12A and 12B can be formed with high accuracy by using the vapor phase method.

A physical deposition method and a chemical deposition method, for example, may be enumerated as the vapor phase method. To be concrete, it is possible to use a vacuum deposition method, a sputtering method, an ion plating method, a laser abrasion method, a CVD (Chemical Vapor Deposition) method and the like as the vapor phase method.

A plasma spraying method, a high-speed gas flame spraying method, an arc spraying method and the like can be used as the spraying method.

Known methods are available as the baking method and an atmosphere baking method, a reactive baking method, a hot press baking method and the like can be used as the baking method.

It should be noted that the negative electrode active material layer 12 alloyed with the negative electrode current collector 11 can be formed at least at a part of the boundary face between the negative electrode active material layer 12 and the negative electrode current collector 11 by using these vapor phase method, spraying method and baking method. Also, it should be noted that, when the boundary face between the negative electrode current collector 11 and the negative electrode active material layer 12 is further alloyed, the negative electrode current collector 11 and the negative electrode active material layer 12 should be further heat-treated under vacuum atmosphere or under non-oxidizing atmosphere, if necessary. Also, although it is frequently observed that the deposited film 13 is formed by natural oxidation after the negative electrode active material layer 12 was formed, it is possible to form the deposited film 13 corresponding to the purpose, if necessary. Consequently, it is possible to obtain the negative electrodes 10A and 10B shown in FIG. 1.

The negative electrode 10 can be manufactured by bonding the negative electrodes 10A and 10B obtained by the above-mentioned method such that the second surfaces of the negative electrode current collectors 11 may be opposed to each other.

Also, as shown in FIG. 4, it is possible to manufacture the negative electrode 15 by forming the interlayer material 21 between the opposed second surfaces of the negative electrode current collector 11.

This negative electrode 10 is able to use the following secondary battery.

FIG. 5 is a schematic perspective view showing an arrangement of the above secondary battery. As shown in FIG. 5, this secondary battery includes a film-like exterior member 41 in which an electrode winding body 30 with leads 31 and 32 attached thereto is housed.

Although not shown, the electrode winding body 30 is produced by winding a laminated body constructed by laminating a negative electrode and a positive electrode through a separator. The outermost peripheral portion of the electrode winding body 30 is protected by a protective tape (not shown). Then, the negative electrode and the positive electrode of the electrode winding body 30 can be energized by electrolyte provided between the negative electrode and the positive electrode of the laminated body.

The leads 31 and 32 are respectively connected to current collector bodies of the positive electrode and the negative electrode of the electrode winding body 30 and they are led out to the outside of the exterior member 41 along the same direction.

The leads 31 and 32 are made of a thin plate-like or fishnet-like metal material and aluminum, copper, nickel or stainless steel and the like can be used as the metal material of the leads 31 and 32.

The exterior member 41 is composed of a rectangular aluminum laminated film back formed of a nylon film, an aluminum foil and a polyethylene film, in that order, from the outside.

The exterior member 41 is located such that the polyethylene film side and the electrode winding body 30 may be opposed to each other. The outer edge portions of the exterior member 41 are brought in close with each other by melt-bonding or an adhesive.

A member with adhesion like a polyolefin resin such as polyethylene, polypropylene, modified polyethylene and modified polypropylene is inserted between the exterior member 41 and the beads 31 and 32 as an adhesive film 42.

It should be noted that the exterior member 41 may be formed by a laminate film having other structure, a polymer film such as polypropylene, a metal film and the like instead of the above-mentioned aluminum laminate film.

It should be noted that, while the exterior member 41 is formed as the above-described film-like can in FIG. 5, it can be formed by an iron can, an aluminum can and the like.

The negative film has the structure in which the negative electrode active material layer is provided on the first surface of the negative electrode current collector and it has the portion in which the second surface of the negative electrode current collectors are opposed to each other. Also, the negative electrode may have an arrangement in which the interlayer material is sandwiched between the second surfaces of the negative electrode current collectors.

The arrangements of the negative electrode current collector and the negative electrode active material layer are similar to those of the above-mentioned negative electrode current collectors and the above-mentioned negative electrode active material layers shown in FIGS. 1 and 4.

A positive electrode includes a positive electrode current collector and a positive electrode active material layer and the positive electrode active material layer is located so as to oppose the negative electrode active material layer.

The positive electrode current collector is made of aluminum, nickel, stainless steel and the like. Also, it is preferable that the positive electrode active material layer should be formed of at least more than one kind of materials which can insert and exclude lithium as a positive electrode active material. If necessary, the positive electrode active material layer can be formed by the above-mentioned material together with a conductive material such as carbon and a binder such as poly(vinylidene fluoride) and styrene butadiene resin.

Lithium containing metal complex oxide expressed by general formula of $Li_xMO_2$ should be preferably used as a positive electrode material which can insert and exclude lithium.

By using the lithium containing metal complex oxide, it is possible to increase a voltage required when the secondary battery is discharged. Further, since the lithium containing metal complex oxide is high in density, it is possible to make a secondary cell become larger in capacity.

It should be noted that MI in the above general formula is more than one kind of transition metals and it is preferable that metals of more than one kind selected from cobalt (Co), nickel (Ni) and manganese (Mn) should be used. Also, X in the general formula may differ depending on the charging and discharging state of the battery and it may fall within a range of $0.05 \leq x \leq 1.10$.

$LiCoO_2$, $LiNiO_2$ and $LiMn_2O_4$ should preferably be used as the lithium containing metal complex oxide and more than two kinds of these lithium containing metal complex oxides may be mixed.

It should be noted that the positive electrode can be manufactured by forming a positive electrode active material layer according to compression molding after a positive active material, a conductive material and a binder were kneaded, a resultant product was dispersed into a dispersion medium such as N-methyl-2-pyrrolidone to produce a mixture slurry and this mixture slurry was coated and dried on a belt-like metal foil positive electrode current collector.

A separator is able to isolate the positive electrode and the negative electrode from each other to thereby prevent an electric current from being short-circuited when the positive electrode and the negative electrode are brought in contact with each other. This separator is made by a polyolefin resin such as polyethylene and polypropylene.

The electrolyte is made by a solvent and an electrolytic salt and it may contain an additive and the like if necessary.

Nonaqueous solvents such as ethylene carbonate, propylene carbonate, dimethyl carbonate, diethyl carbonate and ethyl methyl carbonate may be enumerated as solvents. For example, it is preferable that it is possible to obtain high ion conductivity by mixing a high boiling-point solvent such as ethylene carbonate or propylene carbonate and a low boiling-point solvent such as dimethyl carbonate, diethyl carbonate and ethyl methyl carbonate together.

Also, it is possible to suppress the capacity from being lowered much more by mixing cyclic carbonate having unsaturated linkage such as 1,3-dioxololium-2-on or 4-vinyl-1,3-dioxolane-2-on with a solvent.

In particular, it is preferable that it is possible to achieve larger effects by using 1,3-dioxolylium-2-on and 4-vinyl-1,3-dioxolane-2-on at the same time.

Further, it is possible to suppress the capacity from being lowered by mixing carbonate derivative having halogen atoms into the solvent.

In this case, it is preferable that larger effects can be achieved by mixing cyclic carbonate having unsaturated linkage into the solvent.

It is possible that the carbonate derivative having halogen atoms may be either a cyclic compound or a chain compound and the cyclic compound should preferably be used so that larger effects can be achieved. 4-fluoro-1,3-dioxolane-2-on, 4-chloro-1,3-dioxolane-2-on, 4-bromo-1,3-dioxolane-2-on or 4,5-difluoro-1,3-dioxolane-2-on and the like may be enumerated as the cyclic compounds.

In particular, it is preferable that larger effects can be achieved by using 4-fluoro-1,3-dioxolane-2-on.

Also, if the solvent contains a sultone compound in which —$SO_2$—O— group is bonded to carbon chain or carbon ring, then chemical stability of electrolytic solution can be improved and side reaction of electrode and electrolytic solution can be suppressed. As a result, it is possible to suppress gas from being generated by side reaction and it is possible to enhance the effects to suppress expansion of the battery. 1-3-propene sultone, 1,3-propane sultone, pentane-2,5-sultone may be enumerated as such sultone compounds.

Of these sultone compounds, sultone compounds having unsaturated linkage within the ring should be preferable and 1,3-propane sultone may be preferable, for example. Similarly, it is possible that the solvent may contain sulfone compounds and divinyl sulfone and the like can be used.

$LiPF_6$, $LiCF_3SO_3$ and $LiClO_4$ may be preferable as electrolytic salt and it is possible to mix more than two kinds of electrolytic salts.

Also, electrolyte can also be constructed by gel-like electrolyte in which electrolytic solution is supported by support. The gel-like electrolyte is able to obtain high ion conductivity and it can also prevent liquid from being leaked from the battery or it can also prevent the battery from being expanded at a high temperature. As the support to support the electrolytic solution, there can be used polymer materials such as poly(vinylidene fluoride), polyacrylonitrile, polyethylene oxide and polypropylene oxide.

This secondary battery can be manufactured as follows.

First, leads 31 and 32 are welded to end portions of collectors of positive and negative electrodes formed of belt-like thin films. Next, after the negative and positive electrodes with the leads 31, 32 attached thereto were laminated through the separator, the resultant laminated body is wound in the longitudinal direction and an electrode winding body 30 is formed by bonding a protection tape to the outermost peripheral portion. Next, the electrode winding body 30 is housed within the exterior member 41 into which the electrolytic solution is injected and thereby the electrode winding body 30 is treated by vacuum impregnation. Next, outer edge portions of the exterior member 41 are closely bonded together by hot melt-bond and thereby the electrode winding body 30 is sealed by the exterior member 41. In that case, close-contact films 42 are inserted between the lead 31, 32 and the exterior member 41. Consequently, the secondary battery shown in FIG. 5 is completed.

When this secondary battery is charged, lithium ions are extracted from the positive electrode and they are inserted in the negative electrode through the electrolytic solution. When this secondary battery is discharged, lithium ions are extracted from the negative electrode and they are inserted in the positive electrode through the electrolytic solution. In that case, as shown in FIG. 1, if the secondary battery has the negative electrode structure in which each one side is separated and the secondary battery has the negative electrode structure having the portion in which the second surfaces of the negative electrode collectors 11 are opposed to each other, then it is possible to soften the stress applied to the negative electrode current collector 11 from the negative electrode active material layer 12 when the negative electrode active material layer 12 is expanded and contracted upon charging and discharging. Further, since the surface of the negative electrode current collector 11 is roughened, it is possible to soften the stress considerably.

Also, since the negative electrode active material layer 12 contains oxygen, the mean oxygen content A on the side of the negative electrode current collector 11 is larger than the mean oxygen content B on the surface side. Therefore, it is possible to suppress the negative electrode active material layer 12 from being expanded and contracted, in particular, the negative electrode active material layer 12 from being expanded and contracted at its portion near the negative electrode current collector 11 upon charging and discharging. In consequence, the negative electrode active material layer 12 can be suppressed from being separated from the negative electrode current collector 11.

Also, as shown in FIG. 4, it is possible to soften the stress much more by forming a flexible material such as a plastic film and the interlayer material 21 made of metal lithium between the second surfaces of the opposing negative electrode current collectors 11.

The present invention will be described below with reference to inventive examples.

Inventive Example 1

First, by using a copper foil of a thickness of 12 μm and a ten-point means roughness Rz=1.3 μm to form a negative electrode current collector, only the first surface on which a negative electrode active material layer is to be formed was treated by a rough-processing so as to satisfy a ten-point mean roughness Rz=2.5 μm.

Next, a negative electrode active material layer having a thickness of 8 μm mainly made of tin was formed on the surface on which the negative electrode active material layer is to be formed by an electrolytic plating method and treated for 20 hours at 200° C.

In this manner, there was manufactured a negative electrode (hereinafter referred to as a "one-side negative electrode") having a negative electrode active material layer formed on its one side in which a first surface of a negative electrode current collector is a negative electrode active material layer and in which a second surface is a negative electrode current collector.

A negative electrode in which negative electrode active material layers are formed on both surface, the negative electrode current collectors being opposed to each other were manufactured by laminating two one-side negative electrodes such that their negative electrode current collectors may be opposed to each other.

Also, lithium cobalt oxide power of average grain diameter 5 μm as a positive electrode active material, carbon black as a conductive material and poly(vinylidene fluoride) as a binder were mixed by a mass ratio of lithium cobalt oxide:carbon black: poly(vinylidene fluoride)=92:3:5 and there were injected into N-methyl-2-pyrrolidone, which serves as a dispersion medium, so as to obtain mixture slurry. Thereafter, this mixture slurry was coated on a positive electrode current collector formed of an aluminum foil, was dried and pressurized so as to form a positive electrode active material layer and a positive electrode was produced.

These negative and positive electrodes were laminated through the separator, the resultant laminated body is wound in the longitudinal direction and an electrode winding body was formed by bonding a protection tape to the outermost peripheral portion. Next, the electrode winding body was housed within an exterior member formed of an aluminum laminated film into which the electrolytic solution was injected and thereby the electrode winding body was treated by vacuum impregnation. Next, outer edge portions of the exterior member were sealed in vacuum.

It should be noted that a polyethylene film was used as the separator. Also, the electrolytic solution was such electrolytic solution in which electrolytic salt $LiPF_6$ with a concentration of 1 mol/$dm^3$ was dissolved into a solvent in which ethylene carbonate and diethylene carbonate were mixed with a mass ratio of 30:70 and in which 10 weight % of vinylene carbonate was further added to the whole solution quantity.

In this manner, a secondary battery of the inventive example 1 was manufactured.

Inventive Example 2

First, a 12 μm-thick copper foil with the ten-point mean roughness Rz=1.3 μm that will become a negative electrode current collector was roughened only at its first surface with the negative electrode active material layer so as to satisfy the ten-point mean roughness Rz=2.5 μm.

Next, a 6 μm-thick negative electrode active material layer, which was mainly made of silicon (Si), was deposited on the surface with the negative electrode active material layer through a silicon target by a sputtering method. In that case, a discharge gas was argon (Ar) gas and a flow rate of the discharge gas was held constant at 50 $cm^3$/min.

In this manner, there was manufactured a one-side negative electrode in which the first surface of the current collector was the negative electrode active material layer, the second surface being the negative electrode current collector.

A negative electrode having negative electrode active material layers formed on both surfaces and in which the negative electrode current collectors were opposed to each other was manufactured by laminating two of the above-described one-side negative electrode in such a manner that their negative electrode current collectors may be opposed to each other.

A secondary battery of the inventive example 2 was manufactured similarly to the inventive example 1 except that the above-described negative electrode was in use.

Comparative Example 1

First, a 24 μm-thick copper foil that will become a negative electrode current collector was roughened at its both surfaces so as to satisfy the ten-point mean roughness Rz=2.5 μm.

Next, by a method similar to that of the inventive example 2, there was manufactured a negative electrode in which 8 μm-thick negative electrode active material layers, which was made of mainly tin (Sn), were formed on both surfaces of the negative electrode current collector.

A secondary battery of the comparative example 1 was manufactured similarly to the inventive example 1 except that the above-described negative electrode was in use.

Comparative Example 2

First, a 24 μm-thick copper foil that will become a negative electrode current collector was roughened at its both surfaces so as to satisfy the ten-point mean roughness Rz=2.5 μm.

Next, by a method similar to that of the inventive example 2, there was manufactured a negative electrode in which 6 μm-thick negative electrode active material layers, which was made of mainly silicon (Si), were formed on both surfaces of the negative electrode current collector.

A secondary battery of the comparative example 2 was manufactured similarly to the inventive example 1 except that the above-described negative electrode was in use.

(Charging and Discharging Tests)

Charging and discharging tests were given to the thus manufactured secondary batteries under condition of 25° C. and capacity retention ratios and expansion changing ratios were measured.

In that case, only in the charging and discharging of the first cycle, after the secondary battery was charged at a constant current density of 0.2 mA/$cm^2$ until a battery voltage reaches 4.2V, the secondary battery was charged at a constant voltage of 4.2V until the current density reaches 0.05 mA/$cm^2$. The secondary battery was discharged at a constant current density of 0.2 mA/$cm^2$ until the battery voltage reaches 2.5V. In the cycles following the second cycle, after the secondary battery was charged at a constant current density of 1 mA/$cm^2$ until the battery voltage reaches 4.2V, the secondary battery was charged at a constant voltage of 4.2V until the current density reaches 0.05 mA/cm². The secondary battery was discharged at a constant current density of 1 mA/cm² until the battery voltage reaches 2.5V. It should be noted that, when the secondary battery is charged, utilization factor of the capacity of the negative electrode reached 90% so that the metal lithium may not be deposited on the negative electrode.

The capacity retention ratio was calculated as the ratio of the discharge capacity obtained at the 50th cycle relative to the discharge capacity obtained at the second cycle, that is, (discharge capacity obtained at the 50th cycle/discharge capacity obtained at the second cycle)×100. Obtained results are shown on the following table 1.

Also, the expansion changing ratio was calculated as the ratio of the difference between the battery thickness required when the battery was charged 50 cycles and the battery thickness required when the battery was charged one cycle relative to the battery thickness required when the battery was charged one cycle, that is, {(battery thickness required when the battery is charged 50 cycles−battery thickness required when the battery is charged one cycle)/battery thickness required when the battery is charged one cycle}×100%. Obtained results are shown on the following table 1.

Also, after the thus manufactured secondary batteries of the inventive examples 1 and 2 and the comparative examples 1 and 2 were charged and discharged one cycle, they were disassembled and negative electrodes thereof are removed from the secondary batteries. Those negative electrodes were rinsed by a solution of dimethyl carbonate, dried and the sections of negative electrodes were sliced out by the focused ion beam (FIB) method. After that, with respect to the thus sliced sections, oxygen contents in the negative electrode active material layers were measured by line analysis of the Auger Electron Spectroscopy (AES). Oxygen contents of five portions, which had been randomly selected from the negative electrode active material layer, were measured and a mean value was calculated. These obtained results also are shown on the following table 1.

More specifically, since the negative electrode has the structure with the portion in which the second surfaces of the negative electrode current collectors are opposed to each other, it is possible to soften the stress applied to the negative electrode current collector from the negative electrode active material layer when the negative electrode active material layer is expanded and contracted upon charging and discharging and cycle characteristics of the secondary battery can be improved.

Inventive Examples 3 to 14

Secondary batteries were manufactured by a method similar to that of the inventive example 2 except that the first surface to form the negative electrode material layer was roughened by using a copper foil, which forms the negative electrode current collector, with a thickness of 12 μm and a ten-point mean roughness Rz=1.3 μm while the ten-point mean roughness of the first surface was being changed as shown on the table 2. The thus manufactured secondary batteries were used as inventive examples 3 to 14.

Inventive Examples 15 to 24

Secondary batteries were manufactured by a method similar to that of the inventive example 2 except that the 12 μm-thick copper foil, which forms the negative electrode current collector, was roughened at its first surface so as to satisfy a ten-point mean roughness Rz=2.5 μm and that the second surface without the negative electrode active material layer was roughened while the ten-point mean roughness Rz thereof was being changed as shown on the table 2. The thus manufactured secondary batteries were used as inventive examples 15 to 24.

Comparative Examples 3 and 4

Secondary batteries were manufactured by a method similar to that of the comparative example except that both surfaces of a 24 μm-thick copper foil, which forms the negative electrode current collector, were roughened while the ten-point mean roughness Rz thereof was changed as shown on the table 2. The thus manufactured secondary batteries were used as comparative examples 3 and 4.

Charging discharging tests were given to the thus manufactured secondary batteries of the inventive examples 3 to 24 and the comparative examples 3 and 4 similarly to the inventive examples 1 and 2 and the comparative examples 1, 2 and capacity retention ratios and expansion changing ratios were measured. Also, oxygen contents in the negative electrode active material layers were measured. Measured results are shown on the following table 2.

TABLE 1

| | Active Material | Surface roughness Rz [μm] | | Negative electrode oxygen content [at. %] | Expansion changing ratio [%] | Capacity retention ratio [%] |
| --- | --- | --- | --- | --- | --- | --- |
| | | Surface with active material layer | Surface without active material layer | | | |
| Inventive Example 1 | Sn | 2.5 | 1.3 | 4 | 5 | 78 |
| Inventive Example 2 | Si | 2.5 | 1.3 | 5 | 4 | 85 |
| Comparative Example 1 | Sn | 2.5 | — | 4 | 9 | 68 |
| Comparative Example 2 | Si | 2.5 | — | 5 | 7 | 77 |

As shown on the table 1, according to the inventive examples 1 and 2 having the structures in which tin (Sn) or silicon (Si) was formed on the first surface of the negative electrode current collector as the negative electrode active material and in which the second surfaces of the one-side negative electrodes are bonded to each other, as compared with the comparative examples 1 and 2 in which the negative electrode active material layers are formed on both surfaces of the negative electrode current collector, the rise of battery expansion changing ratios could be suppressed and high capacity retention ratios could be obtained.

TABLE 2

| | Active Material | Surface roughness Rz [μm] | | Negative electrode oxygen content [at. %] | Expansion changing ratio [%] | Capacity retention ratio [%] |
|---|---|---|---|---|---|---|
| | | Surface with active material layer | Surface without active material layer | | | |
| Inventive Example 3 | Si | 1.1 | 1.3 | 5 | 3 | 70 |
| Inventive Example 4 | Si | 1.3 | 1.3 | 5 | 4 | 78 |
| Inventive Example 5 | Si | 1.6 | 1.3 | 5 | 3 | 80 |
| Inventive Example 6 | Si | 2.1 | 1.3 | 5 | 4 | 83 |
| Inventive Example 7 | Si | 3.6 | 1.3 | 5 | 4 | 79 |
| Inventive Example 8 | Si | 4 | 1.3 | 5 | 3 | 79 |
| Inventive Example 9 | Si | 4.5 | 1.3 | 5 | 5 | 77 |
| Inventive Example 10 | Si | 6.1 | 1.3 | 6 | 5 | 74 |
| Inventive Example 11 | Si | 7 | 1.3 | 6 | 6 | 75 |
| Inventive Example 12 | Si | 8.1 | 1.3 | 6 | 8 | 73 |
| Inventive Example 13 | Si | 8.8 | 1.3 | 6 | 9 | 73 |
| Inventive Example 14 | Si | 9.5 | 1.3 | 6 | 11 | 70 |
| Inventive Example 15 | Si | 2.5 | 1.4 | 5 | 5 | 85 |
| Inventive Example 16 | Si | 2.5 | 1.5 | 5 | 4 | 88 |
| Inventive Example 17 | Si | 2.5 | 2.1 | 5 | 4 | 91 |
| Inventive Example 18 | Si | 2.5 | 3 | 5 | 4 | 93 |
| Inventive Example 19 | Si | 2.5 | 3.9 | 5 | 4 | 90 |
| Inventive Example 20 | Si | 2.5 | 5.2 | 5 | 4 | 88 |
| Inventive Example 21 | Si | 2.5 | 6.5 | 5 | 5 | 88 |
| Inventive Example 22 | Si | 2.5 | 7.7 | 5 | 6 | 86 |
| Inventive Example 23 | Si | 2.5 | 8.7 | 5 | 6 | 86 |
| Inventive Example 24 | Si | 2.5 | 9.3 | 5 | 9 | 82 |
| Comparative Example 3 | Si | 1.4 | — | 5 | 5 | 68 |
| Comparative Example 4 | Si | 7 | — | 6 | 13 | 57 |

As shown on the table 2, according to the inventive examples 3 to 24 having the structures in which tin (Sn) or silicon (Si) was formed on the first surface of the negative electrode current collector as the negative electrode active material and in which the second surfaces of the one-side negative electrodes are bonded to each other, the rise of battery expansion changing ratios could be suppressed and high capacity retention ratios could be obtained.

Further, according to the inventive examples 4 to 13, since the rise of the battery expansion changing ratios could be suppressed more and higher capacity retention ratios could be obtained as compared with the inventive examples 3 and 14, it is preferable that the ten-point mean roughness Rz of the first surface of the negative electrode current collector should be selected so as to fall within a range of from 1.2 μm to 9.0 μm.

Also, according to the inventive examples 16 to 23, since the rise of the battery expansion changing ratios could be suppressed more and higher capacity retention ratios could be obtained as compared with the inventive examples 15 and 24, it is preferable that the ten-point mean roughness Rz of the second surface of the negative electrode current collector should be selected so as to fall within a range of from 1.2 μm to 9.0 μm.

More specifically, since the negative electrode has the structure with the portion in which the second surfaces of the negative electrode current collectors are opposed to each other, it is possible to soften the stress applied to the negative electrode current collector from the negative electrode active material layer when the negative electrode active material layer is expanded and contracted upon charging and discharging and cycle characteristics of the secondary battery can be improved.

Further, by determining the ten-point mean roughness Rz of the first surface of the negative electrode current collector in a range of from 1.2 µm to 9.0 µm and also by determining the ten-point mean roughness Rz of the second surface of the negative electrode current collector in a range of from 1.5 µm to 9.0 µm, it is possible to further suppress the stress applied to the negative electrode current collector from the negative electrode active material layer when the negative electrode active material layer is expanded and contracted upon charging and discharging. Therefore, cycle characteristics of the secondary battery can be improved more.

Inventive Examples 25 to 30

Secondary batteries were manufactured by a method similar to that of the inventive example 2 except that oxygen contents in the negative electrode active materials were controlled by changing the oxygen contents in the negative electrode active material layers as shown on the table 3, and the thus manufactured secondary batteries were used as inventive examples 25 to 30.

It should be noted that, when the oxygen contents in the negative electrode active material were controlled, oxygen was mixed into the negative electrode active material when the negative electrode active material layer mainly made of silicon (Si) was formed on the negative electrode current collector by a sputtering method by selecting a flow rate of discharging gas to be 50 cm³/min while a ratio between the flow rates of argon gas and oxygen was being changed. As described above, the oxygen content in the negative electrode active material were controlled by mixing oxygen into the discharging gas.

Inventive Examples 31 to 34

Secondary batteries are manufactured by a method similar to that of the inventive example 2 except that the first and second layers with the different oxygen concentrations were formed in the negative electrode active material layer and that the oxygen contents in the negative electrode active material were controlled by changing the number of the laminated layers as shown on the table 3, and the thus manufactured secondary batteries were used as inventive examples 31 to 34.

It should be noted that the oxygen contents of the first and second layers in the negative electrode active material are controlled in such a manner that when the negative electrode active material layer mainly made of silicon (Si) was formed on the negative electrode current collector by a sputtering method, a process in which the air is not released and argon (Ar) gas with oxygen concentration of 10% is flowing into a vacuum chamber to oxidize the surface of the active material layer is repeated and that the first and second layers with different oxygen concentrations are laminated alternately. Also, the oxygen content in the active material was controlled by mixing the oxygen gas into the argon gas.

It should be noted that the number of laminated layers may be indicated by the number of the second layers containing a large quantity of oxygen in the negative electrode active material layer.

Charging and discharging tests were given to the thus manufactured secondary batteries of the inventive examples 25 to 34 similarly to the inventive examples 1, 2 and the comparative examples 1, 2 and capacity retention ratios and expansion changing ratios were measured. Also, oxygen contents in the negative electrode active material layers were measured. Measured results are shown on the following table 3.

TABLE 3

| | Active Material | Negative electrode oxygen content [at. %] | Number of laminated layers | Expansion changing ratio [%] | Capacity retention ratio [%] |
|---|---|---|---|---|---|
| Inventive Example 25 | Si | 2.7 | 1 | 8 | 81 |
| Inventive Example 26 | Si | 3.2 | 1 | 5 | 84 |
| Inventive Example 27 | Si | 15 | 1 | 3 | 86 |
| Inventive Example 28 | Si | 30 | 1 | 2 | 88 |
| Inventive Example 29 | Si | 44 | 1 | 4 | 85 |
| Inventive Example 30 | Si | 47 | 1 | 6 | 80 |
| Inventive Example 31 | Si | 14 | 2 | 4 | 90 |
| Inventive Example 32 | Si | 16 | 4 | 4 | 90 |
| Inventive Example 33 | Si | 16 | 6 | 3 | 90 |
| Inventive Example 34 | Si | 18 | 10 | 3 | 92 |

As shown on the table 3, by causing the negative electrode active material to contain oxygen, the rise of the battery expansion changing ratios could be suppressed and high capacity retention ratios could be obtained.

Also, according to the inventive examples 31 to 34 on the table 3, by alternately laminating the first and second layers in which oxygen contents in the negative electrode active material are different, rise of the battery expansion ratios can be suppressed and high capacity retention ratios could be obtained.

Further, according to the inventive examples 26 to 29, since larger effects can be achieved in the battery expansion changing ratios and the capacity retention ratios as compared with the inventive examples 25 and 30, it is preferable that the oxygen concentration in the negative electrode active material should fall within a range of from 3 atomic % to 45 atomic %.

More specifically, by causing the negative electrode active material to contain oxygen and by alternately laminating the first and second layers in which the oxygen contents in the negative electrode active material are different, it is possible to suppress the negative electrode active material layer from being expanded and contracted as the secondary battery is charged and discharged and cycle characteristics of the secondary battery can be improved.

Further, by determining the oxygen content in the negative electrode active material such that it may fall within a range of from 3 atomic % to 45 atomic %, it is possible to further suppress the negative electrode active material layer from being expanded and contracted as the secondary battery is charged and discharged and cycle characteristics of the secondary battery can be improved more.

Inventive Examples 35 to 41

Secondary batteries were manufactured by a method similar to that of the inventive example 2 except that the oxygen contents in the negative electrode active material were controlled by changing a difference between the mean oxygen content A of the current collector side in the negative electrode active material and the mean oxygen content B of the surface side as shown on the table 4 and the thus manufactured secondary batteries were used as inventive examples 35 to 41.

It should be noted that, when the oxygen contents in the negative electrode active material were controlled, argon (Ar) gas and oxygen were mixed and used as discharging gas required when the negative electrode active material layer mainly made of silicon (Si) was formed on the negative electrode current collector until the thickness of the negative electrode active material layer was decreased to the half since the negative electrode active material layer has started to be deposited on the negative electrode current collector. After that, only the argon gas was used as the discharging gas. A flow rate of discharging gas was held constant at 50 cm$^3$/min. As described above, the oxygen content in the negative electrode active material were controlled by mixing oxygen into the discharging gas.

Charging and discharging tests were given to the thus manufactured secondary batteries of the inventive examples 35 to 41 similarly to the inventive examples 1, 2 and the comparative examples 1, 2 and capacity retention ratios and expansion changing ratios were measured. Also, oxygen contents in the negative electrode active material layers were measured. Measured results are shown on the following table 4.

TABLE 4

| | Active Material | Negative electrode oxygen content [at. %] | Number of laminated layers | Expansion changing ratio [%] | Capacity retention ratio [%] |
|---|---|---|---|---|---|
| Inventive Example 35 | Si | 16 | 2.6 | 4 | 88 |
| Inventive Example 36 | Si | 17 | 3.2 | 4 | 88 |
| Inventive Example 37 | Si | 18 | 5.4 | 3 | 89 |
| Inventive Example 38 | Si | 17 | 10.8 | 2 | 89 |
| Inventive Example 39 | Si | 19 | 18.9 | 2 | 93 |
| Inventive Example 40 | Si | 20 | 29.3 | 2 | 90 |
| Inventive Example 41 | Si | 20 | 32 | 4 | 83 |

As shown on the table 4, since the mean oxygen content A of the collector side in the negative electrode active material is set to be larger than the mean oxygen content B of the surface side, rise of the battery expansion changing ratios could be suppressed and high capacity retention ratios could be obtained.

Further, according to the inventive examples 35 to 40, since larger effects can be achieved in the battery expansion changing ratios and the capacity retention ratios as compared with the inventive example 41, it is preferable that a difference between the mean oxygen content A of the current collector side in the negative electrode active material and the means oxygen content B of the surface side should fall within a range of from 2 atomic % to 30 atomic %.

More specifically, by determining a difference between the mean oxygen content A of the current collector side in the negative electrode active material and the mean oxygen content B of the surface side, it is possible to suppress the negative electrode active material layer from being expanded and contracted as the secondary battery is charged and discharged and cycle characteristics of the secondary battery can be improved.

Further, by determining a difference between the mean oxygen content A of the current collector side in the negative electrode active material and the means oxygen content B of the surface side such that it may fall within a range of from 2 atomic % to 30 atomic %, it is possible to further soften the stress applied to the negative electrode current collector from the negative electrode active material layer when the negative electrode active material layer is expanded and contracted upon charging and discharging and cycle characteristics of the secondary battery can be improved.

Inventive Example 42

A secondary battery was manufactured by a method similar to that of the inventive example 2 except that a 10 μm-thick polypropylene (PP) film was sandwiched between the second surfaces of the negative electrode current collectors as the interlayer material 21 when one-side negative electrodes were laminated and the thus manufactured secondary battery was used as an inventive example 42.

Inventive Example 43

A secondary battery was manufactured by a method similar to that of the inventive example 2 except that a 10 μm-thick polypropylene (PP) film was sandwiched between the second surfaces of the negative electrode current collectors as the interlayer material 21 when one-side negative electrodes were laminated and further that the negative electrode and the PP film were hot melt-bonded with application of heat to the negative electrode and the thus manufactured secondary battery was used as an inventive example 43.

Inventive Example 44

A secondary battery was manufactured by a method similar to that of the inventive example 2 except that a metal lithium was vapor-deposited on the second surfaces of the negative electrode current collectors so as to have a thickness of 10 μm when one-side negative electrodes were laminated and further that one-side negative electrode in which the negative electrode active material and the metal lithium were short-circuited by punching a part of the electrode and the thus manufactured secondary battery was used as a inventive example 44.

Charging and discharging tests were given to the thus manufactured secondary batteries of the inventive examples similarly to the inventive examples 1, 2 and the comparative examples 1, 2 and capacity retention ratios and expansion changing ratios were measured. Also, oxygen contents in the negative electrode active material layers were measured. The measured results were shown on the table 5.

TABLE 5

| | Active Material | Negative electrode oxygen content [at. %] | Negative electrode structure | Expansion changing ratio [%] | Capacity retention ratio [%] |
|---|---|---|---|---|---|
| Inventive Example 42 | Si | 5 | PP film interlayer material | 3 | 89 |
| Inventive Example 43 | Si | 5 | PP film interlayer material hot melt-bonded | 2 | 91 |
| Inventive Example 44 | Si | 7 | Metal lithium vapor-deposited | 2 | 95 |

As shown on the table 5, according to the inventive example 42 in which the second surfaces of the negative electrode current collectors are opposed to each other through the PP film, rise of battery expansion changing ratios could be suppressed and high capacity retention ratios could be obtained. Also, according to the inventive example 43 in which the PP film of the interlayer material and the second surface of the negative electrode current collector are hot melt-bonded, rise of battery expansion changing ratios could be suppressed much more and higher capacity retention ratios could be obtained.

According to the inventive example 44 in which the metal lithium is vapor-deposited on the second surface of the negative electrode current collectors so that the second surface are opposed to each other, since surplus lithium can be inserted within the negative electrode in advance, the rise of battery expansion changing ratios could be suppressed and high capacity retention ratios could be obtained.

More specifically, since the negative electrode in which the second surfaces of the negative electrode current collectors are opposed to each other through the material different from that of the negative electrode current collector is formed, it is possible to soften the stress applied to the negative electrode current collector from the negative electrode active material layer when the negative electrode active material layer is expanded and contracted upon charging and discharging. Hence, cycle characteristics of the secondary battery can be improved.

Inventive Example 45

A secondary battery was manufactured by a method similar to that of the inventive example except that 4-fluoro-1,3-dioxolane-2-on (FEC) was used as an electrolytic solution instead of ethylene carbonate and the thus manufactured secondary battery was used as a inventive example 45.

Inventive Example 46

A secondary battery was manufactured by a method similar to that of the inventive example 2 except that a solution in which 2 weight % of 1,3-propene sultone (PRS) was added to the total liquid quantity of the electrolytic solution was used as an electrolytic solution and the thus manufactured secondary battery was used as an inventive example 46.

Inventive Example 47

A secondary battery was manufactured by a method similar to that of the inventive example 2 except that 4-fluoro-1,3-dioxolane-2-on was used as an electrolytic solution instead of ethylene carbonate and that a solution in which 2 weight % of 1,3-propene sultone was added to a liquid quantity was further used as an electrolytic solution and the thus manufactured secondary battery was used as a inventive example 47.

Inventive Example 48

A secondary battery was manufactured by a method similar to that of the inventive example 2 except that a solution in which 2 weight % of divinyl sulfone (DBS) was added to the total liquid quantity of an electrolytic solution was used as an electrolytic solution and the thus manufactured secondary battery was used as an inventive example 48.

Inventive Example 49

A secondary battery was manufactured by a method similar to that of the inventive example 2 except that 4-fluoro-1,3-dioxolane-2-on was used as an electrolytic solution instead of ethylene carbonate and that a solution in which 2 weight % of divinyl sulfone was added to a liquid quantity was further used as an electrolytic solution and the thus manufactured secondary battery was used as a inventive example 49.

Charging and discharging tests were given to the thus manufactured secondary batteries of the inventive examples 45 to 47 similarly to the inventive examples 1, 2 and the comparative examples 1, 2 and capacity retention ratios and expansion changing ratios were measured. Also, oxygen contents in the negative electrode active material layers were also measured. Measured results are shown on the following table 6.

TABLE 6

| | Active Material | Negative electrode oxygen content [at. %] | Electrolytic solution | Expansion changing ratio [%] | Capacity retention ratio [%] |
|---|---|---|---|---|---|
| Inventive Example 45 | Si | 4 | FEC | 2 | 94 |

TABLE 6-continued

|  | Active Material | Negative electrode oxygen content [at. %] | Electrolytic solution | Expansion changing ratio [%] | Capacity retention ratio [%] |
|---|---|---|---|---|---|
| Inventive Example 46 | Si | 6 | 2 wt. % PRS | 1 | 87 |
| Inventive Example 47 | Si | 6 | FEC, 2 wt. % PRS | 1 | 96 |
| Inventive Example 48 | Si | 6 | 2 wt. % DBS | 1 | 85 |
| Inventive Example 49 | Si | 6 | FEC, 2 wt. % DBS | 1 | 95 |

As shown on the table 6, according to the inventive example 45 in which halide was added to a part of electrolytic solution, the battery expansion changing ratio could be suppressed from being increased and high capacity retention ratios could be obtained.

Also, according to the inventive example 46 in which 2 weight % of PRS was added to the electrolytic solution and the inventive example 48 in which 2 weight % of DBS was added to the electrolytic solution, the battery expansion changing ratios could be suppressed considerably.

Further, according to the inventive example 47 in which halide was added to a part of electrolytic solution and in which 2 weight % of PRS was added to the electrolytic solution and the inventive example 49 in which 2 weight % of DBS was added to the electrolytic solution, the battery expansion changing ratios could be suppressed from being increased and high capacity retention ratios could be obtained.

More specifically, by adding the halide to a part of the electrolytic solution or by adding the sultone compound or the sulfone compound to the electrolytic solution, it is possible to suppress the negative electrode active material layer from being expanded and contracted upon charging and discharging and the cycle characteristic of the secondary battery can be improved.

While the present invention has been described so far with reference to the embodiments and the inventive examples, the present invention is not limited to those embodiments and those inventive examples and can be modified variously.

For example, while the liquid-like electrolyte was used in the above-described embodiments and inventive examples, instead of the liquid-like electrolyte, polymer materials may be used as a support for electrolyte. Also, inorganic conductive materials such as lithium nitride and lithium phosphate may be used as a support, and lithium nitride and lithium phosphate may be mixed as a support.

Also, while the negative electrode in which the negative electrode active material layers are provided on the negative electrode current collectors has been described so far in the above-described embodiments and inventive examples, the present invention is not limited thereto and a negative electrode may have other layer provided between the negative electrode current collector and the negative electrode active material layer.

Further, while the winding laminate type secondary battery has been described so far in the above-described embodiments and inventive examples, the shape of the electrode of the battery according to the present invention is not limited thereto and the present invention can be similarly applied to secondary batteries including cylindrical electrode, square electrode, thin electrode, large electrode, laminated layer laminate electrode and the like.

It should be understood by those skilled in the art that various modifications, combinations, sub-combinations and alterations may occur depending on design requirements and other factors insofar as they are within the scope of the appended claims or the equivalents thereof.

What is claimed is:

1. A secondary battery comprising:
a positive electrode;
a negative electrode comprising at least two negative electrode portions; and
an electrolyte,
wherein,
each of the at least two negative electrode portions include (a) a negative electrode current collector portion with a first surface and a second surface, (b) a negative electrode active material layer portion on the first surface, and (c) a deposited film portion on the negative electrode active material portion;
the positive electrode and negative electrode are laminated together with the electrolyte therebetween,
the two negative electrode portions are positioned such that the second surfaces of the negative electrode current collector portions face each other, each of the second surfaces having a ten-point mean surface roughness in a range from 1.2 μm to 9 μm without the negative electrode active material layer portion being formed thereon.

2. The secondary battery of claim 1, wherein said electrolyte contains a carbonate derivative including halogen atom.

3. The secondary battery of claim 1, wherein said electrolyte contains a sultone compound.

4. The secondary battery of claim 1, wherein said electrolyte contains a sulfone compound.

5. The secondary battery of claim 1, wherein said negative electrode active material layer portions are formed on said negative electrode current collector portions by at least one method selected from a vapor method, a liquid phase method, and a sintering method.

6. The secondary battery of claim 1, wherein at least one of said negative electrode active material layer portions contains at least more than one kind of elements selected from silicon (Si) and tin (Sn).

7. The secondary battery of claim 1, wherein said first surfaces of said negative electrode current collector portions has a ten-point mean roughness Rz which falls within a range that includes 1.2 μm to 9.0 μm.

8. The secondary battery of claim 1, wherein said second surfaces of said negative electrode current collector portions have a ten-point mean roughness Rz which falls within a range that includes 1.5 μm to 9.0 μm.

9. The secondary battery of claim 1, wherein each of said negative electrode active material layer portions contains oxygen in a concentration in a range that includes 3 atomic % to 45 atomic %.

10. The secondary battery of claim 9, wherein each of said negative electrode active material layer portions includes a plurality of negative electrode active material layers formed by alternately laminating first and second layers with different oxygen contents.

11. The secondary battery of claim 9, wherein, for each negative electrode portion, when A is a mean oxygen content of a portion of the negative electrode active material layer portion nearest the negative electrode current collector portion and B is a mean oxygen content of a portion of the negative electrode active material layer portion farthest from the negative electrode current collector portion, A is larger than B and a difference A−B lies in a range that includes 2 atomic % to 30 atomic %.

12. The secondary battery of claim 1, further comprising a material between said negative electrode current collector portions that is different from that of said negative electrode current collector portions.

13. The secondary battery according to claim 1, wherein the negative electrode portions are separate entities that are laminated together with said negative electrode current collector portions facing each other.

14. The secondary battery of claim 1, wherein the negative electrode portions are provided from a single negative electrode that is folded over such that said negative electrode current collector portions face each other.

15. The secondary battery of claim 1, wherein:
the negative electrode active material layer portion of each negative electrode portion is opposed to a positive electrode active material layer portion, and
the positive electrode active material layer portions to which each negative electrode portion is opposed are different.

16. The secondary battery of claim 1, wherein:
the positive and negative electrodes are coextensive and wound together with one of said first sides of said negative electrode facing said positive electrode and the respective deposited film portion positioned between the one first side of said negative electrode and the electrolyte.

17. The secondary battery of claim 1, wherein the second surfaces are spaced from each other.

18. The secondary battery of claim 1, wherein the deposited film comprises one of oxide or hydroxide.

* * * * *